(12) United States Patent
Shikata et al.

(10) Patent No.: US 7,148,167 B2
(45) Date of Patent: Dec. 12, 2006

(54) ALUMINA/ZIRCONIA CERAMICS AND METHOD OF PRODUCING THE SAME

(75) Inventors: Kunihide Shikata, Kokubu (JP); Shugo Onitsuka, Kokubu (JP); Yucong Wang, Kokubu (JP); Hiroaki Seno, Kokubu (JP)

(73) Assignee: Kyocera Corporation, Kyoto (JP)

(*) Notice: Subject to any disclaimer, the term of this patent is extended or adjusted under 35 U.S.C. 154(b) by 107 days.

(21) Appl. No.: 10/927,266

(22) Filed: Aug. 26, 2004

(65) Prior Publication Data

US 2005/0049137 A1   Mar. 3, 2005

(30) Foreign Application Priority Data

Aug. 28, 2003 (JP) .............................. 2003-305175
Aug. 28, 2003 (JP) .............................. 2003-305233
Mar. 17, 2004 (JP) .............................. 2004-076032

(51) Int. Cl.
*C04B 35/119* (2006.01)

(52) U.S. Cl. ....................... 501/105; 501/104

(58) Field of Classification Search ............... 501/104, 501/105

See application file for complete search history.

(56) References Cited

U.S. PATENT DOCUMENTS

| 4,729,973 | A | | 3/1988 | Brockway et al. | |
|---|---|---|---|---|---|
| 4,900,492 | A | * | 2/1990 | Claussen et al. | ............ 264/662 |
| 4,999,324 | A | | 3/1991 | Carr et al. | |
| 5,147,833 | A | | 9/1992 | Manning et al. | |
| 5,246,893 | A | | 9/1993 | Takagi et al. | |
| 6,624,106 | B1 | * | 9/2003 | Cohen | ........................ 501/105 |
| 6,862,166 | B1 | * | 3/2005 | Cohen et al. | ............ 361/321.4 |

FOREIGN PATENT DOCUMENTS

| EP | 1 153 899 | 11/2001 |
|---|---|---|
| JP | 01-320264 | 12/1989 |
| JP | 02-006370 | 1/1990 |
| JP | 02-034556 | 2/1990 |
| JP | 05-294718 | 11/1993 |
| JP | 07-206514 | 8/1995 |
| JP | 09-221354 | 8/1997 |
| JP | 2003-321270 | 11/2003 |

OTHER PUBLICATIONS translation of Japanese document 09221354, Aug. 1997.*
Huang, et al., "Microstructure and mechanical properties of ZTA Fabricated by Liquid Phase Sintering", Ceramics International 29 (2003), China, pp. 765-769.

* cited by examiner

*Primary Examiner*—Karl Group
(74) *Attorney, Agent, or Firm*—Hogan & Hartson LLP

(57) ABSTRACT

Alumina/zirconia ceramics containing $Al_2O_3$ in an amount of not less than 65 mass % and $ZrO_2$ in an amount of 4 to 34 mass %, and further containing $TiO_2$, $MgO$ and $SiO_2$. The ceramics effectively suppresses the growth of shape isotropic particles of alumina, suppresses the growth of zirconia particles, and has a high strength and a high hardness. Besides, the ceramics containing SrO features a high fracture toughness.

12 Claims, No Drawings

ALUMINA/ZIRCONIA CERAMICS AND METHOD OF PRODUCING THE SAME

BACKGROUND OF THE INVENTION

1. Field of the Invention

The present invention relates to alumina/zirconia ceramics and, particularly, to alumina/zirconia ceramics preferably used for various structural members, cutting tools, medical instruments and as a material for living bodies, and to a method of producing the same.

2. Description of the Related Art

In recent years, alumina or zirconia oxide ceramics have been extensively used as structural members where a high strength, abrasion resistance and corrosion resistance are required. In particular, alumina/zirconia ceramics containing alumina and zirconia at a predetermined ratio is drawing attention owing its high degree of strength stemming from the effect of fine crystalline particles, and there have been proposed alumina/zirconia ceramics of a variety of compositions.

For example, Japanese Unexamined Patent Publication (Kokai) No. 7-206514 and Japanese Unexamined Patent Publication (Kokai) No. 9-221354 are disclosing alumina/zirconia ceramics obtained by firing by using various assistants ($SiO_2$, MgO and CaO), and teach that those containing alumina in an amount of not smaller than 70 mass % can be densely formed by firing at low temperatures and can, hence, be produced at decreased costs yet offering excellent abrasion resistance. However, the above alumina/zirconia ceramics containing alumina in large amounts exhibit good abrasion resistance accompanied, however, by a defect of small strength and insufficient hardness. Therefore, it has been desired to provide alumina/zirconia ceramics having improved strength, hardness as well as improved abrasion resistance.

Further, when the alumina/zirconia ceramics is used as a cutting tool, the cutting blade tends to be cut away and chipped off due to the lack of toughness and cannot be put to a practical use. Therefore, efforts have been made to improve the toughness by forming shape isotropic particles.

Japanese Unexamined Patent Publication (Kokai) No. 5-294718 teaches a highly tough alumina/zirconia composite material obtained by firing alumina and zirconia by adding $SiO_2$ and at least one of BaO, SrO or CaO. That is, an assistant such as SrO is made present at the time of firing the alumina and zirconia, whereby $Al_2O_3$ crystals grow slenderly; i.e., $Al_2O_3$ particles assume a composition comprising slenderly grown crystals and excellent toughness is exhibited by the slenderly grown $Al_2O_3$ crystals. It has, however, been known that while the fracture toughness increases due to the formation of shape isotropic particles, the strength and hardness undergo a decrease. To further increase the fracture toughness, the shape isotropic particles must be grown more slenderly. However, the strength and hardness decrease with an increase in the size of the particles. That is, the alumina/zirconia ceramics disclosed in the above prior art exhibits improvement in the toughness due to the isotropic growth of alumina but has a bending strength of, for example, not larger than 1050 MPa, and the strength decreases due to the formation of the shape isotropic particles.

SUMMARY OF THE INVENTION

It is therefore an object of the present invention to provide alumina/zirconia ceramics having excellent hardness, strength and abrasion resistance, and a method of producing the same.

Another object of the invention is to produce alumina/zirconia ceramics having the above-mentioned properties as well as a high toughness and a method of producing the same.

In studying the alumina/zirconia ceramics comprising chiefly alumina, the present inventors have discovered that the growth of $Al_2O_3$ and $ZrO_2$ can be effectively suppressed by conducting the firing at a low temperature while being blended with predetermined amounts of $TiO_2$, MgO and $SiO_2$, that a sintered body having a high strength, a high hardness and excellent abrasion strength can be obtained, and have thus arrived at the present invention.

Namely, according to the present invention, there is provided alumina/zirconia ceramics containing $Al_2O_3$ in an amount of not less than 65 mass % and $ZrO_2$ in an amount of 4 to 34 mass %, and further containing $TiO_2$, MgO and $SiO_2$.

According to the present invention, further, there is provided a method of producing alumina/zirconia ceramics comprising:

providing a starting material powder containing not less than 65 mass % of Al calculated as an oxide, 4 to 34 mass % of Zr calculated as an oxide, and not less than 0.1 mass % of Ti, Mg and Si calculated as oxides, the total amount of Ti, Mg and Si being not larger than 4.5 mass % calculated as oxides;

molding said starting material powder into a predetermined shape;

firing the obtained molded body at a temperature in a range of 1300° C. to 1500° C.; and conducting a hot hydrostatic pressure treatment at a temperature which is lower than said firing temperature by not less than 30° C.

The alumina/zirconia ceramics of the invention contains alumina in large amounts, further contains $TiO_2$, MgO and $SiO_2$ stemming from the sintering assistant, and is densely formed due to firing at a low temperature (1300 to 1500° C.) and, hence, exhibits excellent strength, hardness and abrasion resistance. Besides, the alumina/zirconia ceramics which further contains SrO stemming from the sintering assistant, particularly, has SrO existing as a solid solution in a portion of the $ZrO_2$ particles. As a result, tetragonal $ZrO_2$ is metastabilized without forming shape isotropic particles, a high degree of strength and a high degree of toughness are accomplished owing to the stress-induced phase shifting effect making it possible to realize a flexural strength of not smaller than, for example, 1200 MPa, a fracture toughness of not smaller than 4.2 MPa·$m^{1/2}$ and a Vickers' hardness of not smaller than 1700.

The alumina/zirconia ceramics of the invention having the above properties can be used for a variety of structural members, cutting tools, medical instruments, and as a material for living bodies, such as artificial bones and artificial dental roots.

DETAILED DESCRIPTION OF THE INVENTION (Alumina/Zirconia Ceramics)

The ceramics of the present invention contains $Al_2O_3$ particles and $ZrO_2$ particles as basic components, and has an alumina-rich composition containing $Al_2O_3$ in an amount of not less than 65 mass %, preferably, 70 to 85 mass % and, more preferably, 75 to 79 mass %, and containing $ZrO_2$ in an amount of 4 to 34 mass %, preferably, 15 to 30 mass %, and particularly preferably, in an amount of 19 to 24 mass %. That is, by containing $Al_2O_3$ in an amount of not less than 65 mass %, it is allowed to achieve the effect of a high strength and a high hardness. When the content of $ZrO_2$ is smaller than 4 mass %, the $Al_2O_3$ crystals grow into large sizes causing a striking decrease in the strength. When the content of $ZrO_2$ exceeds 34 mass %, on the other hand, the hardness decreases due to a decrease in the Young's modulus.

In the present invention, further, $TiO_2$, MgO and $SiO_2$ are contained as components stemming from the sintering assistants. In the alumina/zirconia ceramics, in general, an increase in the content of $Al_2O_3$ helps increase the Young's modulus and hardness and improve the abrasion resistance causing, however, an increase in the firing temperature and, hence, resulting in an increase in the growth of crystalline particles and a drop in the strength. By using the above three kinds of assistants, however, the eutectic point of alumina and zirconia decreases down to not higher than 1300° C., and it is allowed to obtain a sintered body of a dense and fine particle structure by firing at a low temperature of 1300 to 1500° C. That is, the alumina/zirconia ceramics of the invention is densely formed by firing at a low temperature of 1300 to 1500° C. Despite of a large alumina content, therefore, the growth of crystalline particles is effectively suppressed avoiding the hindrance against achieving high density caused by shape isotropic particles and achieving a high hardness and a high strength owing to fine particles and a high degree of density.

In the ceramics of the invention, it is desired that $TiO_2$, MgO and $SiO_2$ stemming from the sintering assistants are contained in amounts of not smaller than 0.1 mass %, respectively, to lower the eutectic point down to not higher than 1300° C. and to realize a high density at a low temperature. In particular, it is desired that the content of $TiO_2$ is not smaller than 0.22 mass % and, more preferably, not smaller than 0.3 mass %, the content of MgO is not smaller than 0.12 mass %, and more preferably, not smaller than 0.2 mass %, the content of $SiO_2$ is not smaller than 0.20 mass % and, more preferably, not smaller than 0.40 mass %, and that the total amount of these three kinds of assistants is in a range of 0.6 mass % to 4.5 mass % and, particularly, 1.0 to 3.0 mass %. When the contents of the components or the total content of the components are smaller than the above ranges, it becomes difficult to increase the density due to lack of the liquid phase during the firing or due to a high viscosity of the liquid phase. After all, the firing must be effected at a high temperature, the density is hindered by the shape isotropic particles (particularly, alumina) and zirconia particles grow, causing a decrease in the strength or the hardness. When the contents of the components or the total content of the components exceed the above ranges, on the other hand, irregular and coarse particles grow often resulting in a decrease in the strength.

Among the above assistants, further, it is desired that $TiO_2$ and MgO are contained in such amounts that the element ratio (Ti/Mg) is 0.5 to 1.2 and, particularly, 0.7 to 1.0. That is, when the Ti/Mg ratio is within the above range, the reaction of $TiO_2$ with $Al_2O_3$ is effectively suppressed, formation of the $Al_2TiO_5$ phase having an isotropic coefficient of thermal expansion is effectively suppressed, effectively preventing a drop in the strength caused by the formation of the reaction product. It is further allowed to promote the dissolution of Ti and Mg as solid solutions in the $Al_2O_3$ crystals and to decrease the grain boundary phase after the sintering, offering an advantage in improving the hardness and the strength. For example, Ti and Mg that are existing as solid solutions in a total amount ($TiO_2$, MgO) calculated as oxides of not smaller than 0.1 mass % and, particularly, not smaller than 0.5 mass % per $Al_2O_3$, make it possible to markedly improve the strength and the hardness.

A part of $TiO_2$ and MgO may be dispersed being precipitated, as fine particles of $TiO_2$ and MgO or fine particles of a composite oxide containing Ti and Mg (e.g., $MgAl_2O_4$ and the like), in part of the $Al_2O_3$ crystalline particles. The dispersion of such fine particles strengthens the $Al_2O_3$ crystalline particles and further improves the strength. The fine particles that are precipitated usually has a long-axis diameter of not larger than 0.2 μm and, particularly, not larger than 0.1 μm.

It is further desired that the alumina/zirconia ceramics of the invention contains SrO in addition to the above-mentioned three kinds of assistants. Sr, usually, does not almost dissolve as a solid solution in the $ZrO_2$ crystals. In the presence of $TiO_2$, MgO and $SiO_2$, however, the dissolution of Sr as a solid solution is promoted to exhibit an enhanced stress-induced phase shifting effect for the metastable $ZrO_2$, and the fracture toughness and strength can be improved without forming shape isotropic particles.

Usually, $ZrO_2$ makes it possible to improve mechanical properties as stabilizers such as $Y_2O_3$ and $CeO_2$ are dissolved as solid solutions in suitable amounts. In the alumina/zirconia ceramics, however, $Y_2O_3$ or $CeO_2$ that is dissolved as a solid solution causes an increase in the amount of cubic crystals or an increase in the degree of stability of the tetragonal crystals, and the phase shift contributes little to the fracture toughness. In the present invention, however, SrO dissolves as a solid solution in $ZrO_2$, and tetragonal $ZrO_2$ is metastabilized. Namely, Sr has a large ionic radial difference from Zr and is dissolved little as a solid solution in $ZrO_2$, and cubic crystals are formed little. The stress-induced phase shifting effect is enhanced by the metastabilization of the cubic $ZrO_2$, the fracture toughness is improved without relying upon the formation of the phase isotropic particles, avoiding a drop in the strength and hardness caused by the formation of shape isotropic particles and, hence, making it possible to improve the fracture toughness while improving the strength and hardness at the same time.

In order for the ceramics of the present invention to exhibit a sufficient degree of stress-induced phase shifting effect of the SrO due to the metastabilization of the cubic $ZrO_2$ and to exhibit improved fracture toughness without forming shape isotropic particles, it is desired that the content of SrO is in a range of 0.1 to 4 mass % and the total amount of the SrO and the above-mentioned three kinds of assistants ($TiO_2$, MgO and $SiO_2$) is in a range of 1 to 5 mass %.

In the present invention, the above-mentioned $TiO_2$, too, exhibits a metastabilizing function for the cubic $ZrO_2$. That is, Ti has an ionic radius close to that of Zr. Therefore, even when dissolved in large amounts as a solid solution, Ti does not produce the stabilizing effect to an excess degree and, hence, exhibits the stress-induced phase shifting effect. Accordingly, $TiO_2$ may be dissolved as a solid solution in the $ZrO_2$ together with SrO or instead of SrO. $TiO_2$ dissolved as a solid solution in $ZrO_2$, too, makes it possible to obtain the same metastabilizing effect. In particular, when both SrO and $TiO_2$ are dissolved in $ZrO_2$ as solid solutions, the metastabilized $ZrO_2$ exhibits a high stress-induced phase shifting effect, which is desirable. In this embodiment, in general, when $TiO_2$ is contained in a large amount as compared to SrO (or when SrO is not contained), $TiO_2$ only may dissolve as a solid solution in the $ZrO_2$.

The alumina/zirconia ceramics of the invention may contain a stabilizing agent for $ZrO_2$ as represented by $Y_2O_3$ or $CeO_2$ in addition to the above-mentioned components. When the stabilizing agent is blended in large amounts, however, the degree for stabilizing the tetragonal $ZrO_2$ becomes too high, whereby the stress-induced phase shifting effect of $ZrO_2$ decreases and the toughness may further decrease. It is therefore desired that $Y_2O_3$ is contained in an amount of not larger than 0.4 mol % and, particularly, not larger than 0.2 mol % per the $ZrO_2$, and that $CeO_2$ is contained in an amount of not larger than 4 mol % and, particularly, not larger than 2.5 mol % per the $ZrO_2$.

As will be comprehended from the foregoing description, the alumina/zirconia ceramics of the invention having the above composition effectively avoids the hindrance against enhancing the density caused by shape anisotropic particles and effectively avoids a drop in the strength or hardness caused by the growth of zirconia particles. In the ceramics, for example, the average long-axis particle diameter of the $Al_2O_3$ particles is not larger than 3 µm, and particularly, not larger than 2 µm, and the average particle diameter of the $ZrO_2$ particles is not larger than 0.5 µm and, particularly, not larger than 0.3 µm. In the alumina/zirconia ceramics containing SrO, in particular, the average aspect ratio of $Al_2O_3$ particles is not larger than 2.5, and its long-axis average particle diameter is not larger than 1.5 µm and, particularly, not larger than 1 µm, effectively suppressing the formation of the shape isotropic particles or the growth of zirconia particles.

Besides, not less than 20% and, particularly, not less than 70% of $ZrO_2$ comprises tetragonal crystals suppressing the formation of monoclinic crystals and metastabilizing the tetragonal crystals.

A variety of assistant components contained in the ceramics dissolve as solid solutions in the $Al_2O_3$ crystals and in the $ZrO_2$ crystals, or exist on the grain boundaries of crystals.

As described above, the alumina/zirconia ceramics of the invention has excellent strength and hardness. When SrO is contained, further, the alumina/zirconia ceramics of the invention possesses a very high fracture toughness yet having the above properties and, as will become clear from Examples appearing later, exhibits a flexural strength of not smaller than 1200 MPa and, particularly, not smaller than 1400 MPa, a fracture toughness of not smaller than 4.2 $MPa \cdot m^{1/2}$ and, particularly, not smaller than 5.0 $MPa \cdot m^{1/2}$, and a Vickers' hardness of not smaller than 1700 and, particularly, not smaller than 1750.

(Production of Alumina/Zirconia Ceramics)

The above-mentioned alumina/zirconia ceramics of the invention is produced by preparing a starting material powder of a predetermined composition, molding it into a predetermined shape, followed by firing and hot hydrostatic pressure treatment.

The starting material powder that is used contains a variety of metal components so that the sintered body of the above-mentioned composition can be obtained, e.g., contains an Al component that serves as an $Al_2O_3$ source, contains a Zr component that serves as a $ZrO_2$ source, contains a Ti component, an Mg component and an Si component as assistant components and, further contains an Sr component as an SrO source. These metal components are, usually, used in the form of oxides. However, the metal components need not be limited to oxides provided they are capable of forming the above-mentioned various oxides upon firing; i.e., the metal components can be used in the form of simple metals, hydroxides or salts such as carbonates. That is, the starting material powder is prepared by mixing the starting materials of these metals, and the ratios of contents of metals in the starting material powder are so set that the amounts of Al, Zr, Sr, Ti, Mg and Si are corresponded to the composition of the above sintered body calculated as oxides. It is further desired that the average particle size of the starting material powder is, generally, not larger than 1.0 µm. In particular, it is desired that the average particle size of the Zr starting powder is not later than 0.2 µm.

The starting material powder is molded; i.e., as required, a slurry or a paste of the starting material powder is prepared by using a solvent such as water or an organic solvent, and an organic binder, or the slurry or the paste thereof is dried to obtain a powder. The slurry, paste or powder is molded. As the molding means, there can be employed any known means, such as press molding, casting, cold hydrostatic pressure molding or cold hydrostatic pressure treatment.

The molded body is sintered in a temperature range of 1300 to 1500° C. and, particularly, 1350 to 1450° C. to increase the density while suppressing the growth of $Al_2O_3$ and $ArO_2$ particles. For example, if the firing is conducted at a temperature of higher than 1500° C. under a condition where, for example, SrO is existing, SrO reacts with $Al_2O_3$ whereby isotropic particles grow causing the sintered body to exhibit a decreased strength and a decreased hardness. Besides, the strength and hardness decrease due to an increase in the amount of monoclinic $ZrO_2$ as a result of the growth of $ZrO_2$ particles. The density is not heightened by the firing at a temperature of lower than 1300° C.

In the present invention which uses $SiO_2$, $TiO_2$ and MgO in predetermined amounts as sintering assistants, the eutectic point becomes lower than 1300° C., the liquid phase is formed during the sintering to greatly promote the sintering of the material and, besides, dissolution of SrO in $ZrO_2$ as a solid solution is promoted. Through the firing in a relatively low temperature region as described above, it is allowed to obtain a sintered body having a high density while suppressing the growth of isotropic particles. Therefore, the texture becomes fine without decreasing the strength and hardness, and toughness is enhanced due to the stress-induced phase shifting effect stemming from the dissolution of SrO as a solid solution in $ZrO_2$.

The firing time in the above temperature range may be such that a relative density of not smaller than 95% is accomplished as measured by, for example, Archimedes' method, and is, usually, about 1 to about 5 hours. The firing is conducted in an inert gas atmosphere or in an oxidizing atmosphere. When the firing is conducted in the oxidizing atmosphere such as in the open air or in a mixed gas atmosphere having a predetermined oxygen partial pressure, the dissolution of $TiO_2$ and MgO as solid solutions in the $Al_2O_3$ crystal particles is promoted to effectively improve the hardness and strength due to a decrease in the crystalline grain boundaries.

The hot hydrostatic pressure treatment is conducted in the same atmosphere as the firing following the firing at a temperature lower than the above firing temperature by not less than 30° C., preferably, by not less than 50° C. and, more preferably, by not less than 100° C. This makes it possible to prepare dense alumina/zirconia ceramics comprising fine alumina and zirconia particles while suppressing the growth of isotropic particles of alumina. As described already, the sintered body has a high toughness as well as a high strength and a high hardness.

The hot hydrostatic pressure treatment pulverizes the alumina and zirconia into fine particles within short periods of time. Usually, therefore, the hot hydrostatic pressure treatment is conducted with the lower-limit temperature of not lower than 1200° C. and, particularly, not lower than 1250° C. for about 0.5 to about 2 hours.

In the present invention, further, a heat treatment (reducing treatment) may be carried out in a reducing atmosphere after the above hot hydrostatic pressure treatment has been finished. The reducing treatment is conducted in a temperature region lower than the above firing temperature region by not less than 60° C., for example, at a temperature of 1100 to 1350° C. for about 1 to about 10 hours. Through the reducing treatment, for example, Ti atoms are partly reduced from a valency of four to a valency of three, whereby the Ti oxide dissolves in the alumina in an increased amount. As a result, the solubility of Mg in alumina decreases, and fine particles of an oxide (e.g., $MgAl_2O_4$ which is a solid solution of Mg) containing Mg precipitate in the $Al_2O_3$ crystal particles. Upon precipitating the fine particles in the $Al_2O_3$ crystalline particles, it is allowed to further reinforce the $Al_2O_3$ crystalline particles and to enhance the strength and hardness as described earlier.

EXAMPLES

Experiment 1

An $Al_2O_3$ powder having a purity of 99.9 mass % and an average crystalline particle size of 0.5 μm;

a $ZrO_2$ powder having a purity of 99.9 mass % and an average particle diameter of 0.2 μm;

a metastable $ZrO_2$ containing $Y_2O_3$ at a ratio of 0 mol %, 1.5 mol %, 2 mol % or 3 mol %; and an $SiO_2$ powder, a $TiO_2$ powder and an $Mg(OH)_2$ powder, respectively, having purities of not smaller than 99.5 mass % and average particle sizes in a range of 0.5 to 1.0 μm;

were mixed together at ratios shown in Table 1 calculated as oxides to obtain mixed powders that served as starting materials.

The mixed powder were mixed into an isopropyl alcohol (solvent), were molded with a pressure of 100 MPa, and were put to the cold hydrostatic pressure treatment under 300 MPa.

The treated products were fired at temperatures shown in Table 1 in the atmosphere for 5 hours. Some of the samples were put to the hot hydrostatic pressure treatment at temperatures (HIP temperatures) shown in Table 1 in an Ar—$O_2$ ($O_2$ concentration: 20 volume %) mixed gas atmosphere under a pressure of 200 MPa. Some of the samples were further heat-treated at temperatures (hydrogen-treating temperatures) shown in Table 1 in a hydrogen atmosphere for 5 hours to obtain sintered bodies.

The obtained sintered bodies were measured for their $Al_2O_3$ crystalline particle sizes (long-axis diameters) and $ZrO_2$ crystalline particle sizes from the scanning electron microphotographs of the cross sections thereof.

Further, the ratios of the tetragonal $ZrO_2$ in the whole $ZrO_2$ were found relying upon the X-ray analysis (XRD) from the following formula, Ratio of tetragonal crystals (%)=$I_t/(I_{m1}+I_{m2}+I_t)$ where $I_t$: X-ray diffraction intensity on the tetragonal crystal plane (111), $I_{m1}$: X-ray diffraction intensity on the monoclinic plane (111);

$I_{m2}$: X-ray diffraction intensity on the monoclinic plane (-11-1).

For some samples, the amounts of $TiO_2$ and MgO dissolved as solid solutions in the $Al_2O_3$ crystalline particles were found by measuring the lattice constant of $Al_2O_3$. As for the samples heat-treated (reduced) in the hydrogen atmosphere, it was confirmed by using a transmission type electron microscope that the fine $MgAl_2O_4$ particles had been precipitated and dispersed in the crystalline particles.

Further, the samples were measured for their three-point flexural strengths (JIS R 1601) and Vickers' hardness(JIS Z 2244). The results were as shown in Table 2 which also shows the results of the analysis of the above structures.

TABLE 1

| Sample No. | $Al_2O_3$ (mass %) | $ZrO_2$ (mass %) | $Y_2O_3$ concentration in $ZrO_2$ (mol %) | Assistants | | | Total amount (mass %) | Firing temperature (° C.) | HIP temperature (° C.) | $H_2$-treating temperature (° C.) |
| | | | | $SiO_2$ (mass %) | $TiO_2$ (mass %) | MgO (mass %) | | | | |
| --- | --- | --- | --- | --- | --- | --- | --- | --- | --- | --- |
| 1 | 65 | 33 | 2 | 0.5 | 1 | 0.5 | 2 | 1300 | — | — |
| 2 | 71 | 27 | 2 | 0.5 | 1 | 0.5 | 2 | 1350 | — | — |
| 3 | 78 | 20 | 2 | 0.5 | 1 | 0.5 | 2 | 1350 | — | — |
| 4 | 90 | 8 | 2 | 0.5 | 1 | 0.5 | 2 | 1400 | — | — |
| 5 | 93 | 5 | 2 | 0.5 | 1 | 0.5 | 2 | 1450 | — | — |
| *6 | 80 | 20 | 1.5 | 0 | 0 | 0 | 0 | 1570 | — | — |
| *7 | 79.5 | 20 | 1.5 | 0.2 | 0.2 | 0.1 | 0.5 | 1550 | — | — |
| *8 | 78.5 | 20 | 1.5 | 0.1 | 0.9 | 0.5 | 1.5 | 1510 | — | — |
| 9 | 79.2 | 20 | 1.5 | 0.4 | 0.25 | 0.15 | 0.8 | 1400 | — | — |
| 10 | 78.5 | 20 | 1.5 | 0.5 | 0.6 | 0.3 | 1.4 | 1400 | — | — |
| 11 | 77.5 | 20 | 1.5 | 1 | 1 | 0.5 | 2.5 | 1350 | — | — |
| 12 | 75.8 | 20 | 1.5 | 1.8 | 1.6 | 0.8 | 4.2 | 1300 | — | — |
| *13 | 75 | 20 | 1.5 | 2 | 2 | 1 | 5 | 1300 | — | — |

TABLE 1-continued

| Sample No. | Al$_2$O$_3$ (mass %) | ZrO$_2$ (mass %) | Y$_2$O$_3$ concentration in ZrO$_2$ (mol %) | Assistants SiO$_2$ (mass %) | TiO$_2$ (mass %) | MgO (mass %) | Total amount (mass %) | Firing temperature (° C.) | HIP temperature (° C.) | H$_2$-treating temperature (° C.) |
|---|---|---|---|---|---|---|---|---|---|---|
| 14 | 83.6 | 15 | — | 0.8 | 0.3 | 0.3 | 1.4 | 1300 | 1200 | — |
| 15 | 83.2 | 15 | — | 0.8 | 0.6 | 0.4 | 1.8 | 1350 | 1250 | — |
| 16 | 83 | 15 | — | 0.8 | 0.8 | 0.4 | 2 | 1350 | 1250 | — |
| 17 | 83.2 | 15 | — | 0.8 | 0.7 | 0.3 | 1.8 | 1350 | 1250 | — |
| 18 | 83.1 | 15 | — | 0.8 | 0.8 | 0.3 | 1.9 | 1350 | 1250 | — |
| 19 | 78 | 20 | 3 | 0.5 | 1 | 0.5 | 2 | 1350 | 1250 | — |
| 20 | 78 | 20 | 3 | 0.5 | 1 | 0.5 | 2 | 1350 | 1250 | 1200 |
| 21 | 78 | 20 | 2 | 0.5 | 1 | 0.5 | 2 | 1350 | 1250 | 1250 |
| 22 | 78 | 20 | 1.5 | 0.5 | 1 | 0.5 | 2 | 1350 | 1250 | 1250 |
| 23 | 78 | 20 | — | 0.5 | 1 | 0.5 | 2 | 1350 | 1250 | 1250 |

Mark * represents Comparative Examples.

TABLE 2

| Sample No. | Average particle size Al$_2$O$_3$ (μm) | Average particle size ZrO$_2$ (μm) | Tetragonal crystal ZrO$_2$ (%) | Amount of TiO$_2$ and MgO dissolving in Al$_2$O$_3$ (mol %) | Particle precipitated in Al$_2$O$_3$ crystal particle | Flexural strength (MPa) | Hardness (Hv) |
|---|---|---|---|---|---|---|---|
| 1 | 0.8 | 0.2 | 92 | 0.4 | — | 1720 | 1705 |
| 2 | 0.8 | 0.2 | 97 | 0.55 | — | 1711 | 1712 |
| 3 | 1.1 | 0.2 | 88 | 0.55 | — | 1545 | 1794 |
| 4 | 1.5 | 0.3 | 91 | 0.85 | — | 1320 | 1810 |
| 5 | 1.8 | 0.4 | 96 | 0.9 | — | 1308 | 1846 |
| *6 | 3.8 | 1.2 | 38 | 0 | — | 1129 | 1643 |
| *7 | 3.5 | 0.7 | 45 | 0.2 | — | 1081 | 1630 |
| *8 | 3.1 | 0.6 | 67 | 1.1 | — | 1142 | 1635 |
| 9 | 2.2 | 0.5 | 78 | 0.23 | — | 1421 | 1811 |
| 10 | 2.4 | 0.5 | 79 | 0.4 | — | 1576 | 1790 |
| 11 | 1.6 | 0.5 | 63 | 0.5 | — | 1467 | 1775 |
| 12 | 1.3 | 0.4 | 76 | 0.4 | — | 1623 | 1764 |
| *13 | 3.2 | 0.8 | 43 | 0.4 | — | 1092 | 1590 |
| 14 | 1.2 | 0.3 | 85 | 0.3 | — | 1742 | 1823 |
| 15 | 1.3 | 0.3 | 87 | 0.5 | — | 1651 | 1771 |
| 16 | 1.3 | 0.3 | 83 | 0.6 | — | 1587 | 1750 |
| 17 | 1.3 | 0.3 | 91 | 0.5 | — | 1505 | 1734 |
| 18 | 1.3 | 0.3 | 88 | 0.5 | — | 1474 | 1713 |
| 19 | 1.5 | 0.3 | 84 | 0.6 | — | 1562 | 1769 |
| 20 | 1.5 | 0.3 | 89 | 0.6 | MgAl$_2$O$_4$ | 1741 | 1827 |
| 21 | 1.5 | 0.3 | 92 | 0.3 | MgAl$_2$O$_4$ | 1773 | 1838 |
| 22 | 1.5 | 0.3 | 84 | 0.3 | MgAl$_2$O$_4$ | 1726 | 1824 |
| 23 | 1.4 | 0.3 | 83 | 0.3 | MgAl$_2$O$_4$ | 1813 | 1859 |

Mark * represents Comparative Examples.

As will be understood from Tables 1 and 2, the alumina/zirconia ceramics of the present invention exhibited flexural strengths of not smaller than 1200 MPa, Vickers' hardness of as high as 1700 Hv or more, and high hardness. In particular, the ceramics of samples Nos. 20 to 23 exhibited the flexural strengths of not smaller than 1700 MPa owing to the effect of promoting the dispersion of fine particles and excellent Vickers' hardness of not smaller than 1800 Hv.

On the other hand, the ceramics of sample No. 6 did not contain assistants (SiO$_2$, TiO$_2$ and MgO). The ceramics of sample No. 7 contained the assistances in small amounts. The sample No. 8 contained SiO$_2$ in a small amount among the above assistants. Therefore, their firing temperatures were high, and the strength and hardness were lowered due to the growth of crystalline particles. The sample No. 13 contained the assistants in too large amounts. Therefore, the grain boundary phase was formed much, and the strength and hardness were lowered.

Experiment 2

Artificial condyles were prepared by using the materials of Nos. 6, 16 and 21 shown in Table 1. Table 3 shows the results of 1000-hour abrasion testing with the mortar made of the same material under the conditions of 60 rpm and a load of 50 kg.

TABLE 3

| Sample No. | Surface roughness Ra (nm) Before abraded | Surface roughness Ra (nm) After abraded | Amount of abrasion ($10^{-3}$ mg/cm$^2$) |
|---|---|---|---|
| 6 | 2.1 | 5.2 | 36 |
| 16 | 1.8 | 2.1 | 1.8 |
| 21 | 1.7 | 1.9 | 1.1 |

Sample No. 6 is a Comparative Example.

It will be understood that compared to the sample No. 6 of Comparative Example, the samples Nos. 16 and 21 of the present invention were abraded little and maintained a good surface state after abraded.

(Experiment 3)

An $Al_2O_3$ powder having a purity of 99.95 mass % and an average particle size of 0.22 μm;

a zirconia powder having a purity of 99.95 mass % and an average particle size of 0.1 μm;

a $TiO_2$ powder having an average particle size of 0.4 μm;

an $Mg(OH)_2$ powder having an average particle size of 0.6 μm;

an $SiO_2$ powder having an average particle size of 0.5 μm; and an $SrCO_3$ powder having an average particle size of 0.2 μm;

were weighed and mixed to obtain compositions shown in Table 4 calculated as oxides to obtain mixed powders that served as starting materials (however, sample No. 6 used a $Y_2O_3$ powder as a stabilizer in an amount of 0.3 mol % per the zirconia, and sample No. 7 used a $CeO_2$ powder as a stabilizer in an amount of 3 mol % per the zirconia).

The mixed powders were molded in a metal mold under a pressure of 1 t/cm$^2$ and were further subjected to the hydrostatic pressure treatment under a pressure of 3 t/cm$^2$ to obtain the molded articles followed by the main firing and the hot hydrostatic pressure treatment (indicated as HIP in Tables) at temperatures shown in Table 4. In all of these cases, the main firing was conducted for 2 hours and the hot hydrostatic pressure treatment was conducted for 1 hour.

The obtained sintered bodies were mirror surface-worked and were heat-etched to measure their crystalline particle sizes, aspect ratios and average long-axis particle diameters by using an electron microscope.

Further, the ratio of the monoclinic $ZrO_2$ was measured relying on the X-ray diffraction (XRD) to measure the degree of metastabilization. Further, the solid solution of Sr or $TiO_2$ in $ZrO_2$ was confirmed by using an energy dispersion composition analyzer (EDS) in the transmission type electron microscope.

The sintered bodies were further measured for their flexural strengths (JIS R 1601), fracture toughness (JIS R 1607) and Vickers' hardness (JIS Z 2244) to obtain the results as shown in Table 4.

TABLE 4

| Sample No. | Main components $Al_2O_3$ (mass %) | Main components $ZrO_2$ (mass %) | Sub-components SrO (mass %) | Sub-components $TiO_2$ (mass %) | Sub-components MgO (mass %) | Sub-components $SiO_2$ (mass %) | Stabilizers $Y_2O_3$ (mol %)* | Stabilizers $CeO_2$ (mol %)* | Firing temperature (° C.) | HIP temperature (° C.) |
|---|---|---|---|---|---|---|---|---|---|---|
| 1 | 73 | 24 | 1.6 | 0.6 | 0.3 | 0.5 | | | 1420 | 1350 |
| 2 | 79 | 19 | 0.7 | 0.6 | 0.3 | 0.4 | | | 1400 | 1350 |
| 3 | 83 | 13 | 1.2 | 1 | 0.6 | 1.2 | | | 1420 | 1350 |
| 4 | 77 | 20 | 0.2 | 1 | 0.5 | 1.3 | | | 1370 | 1350 |
| 5 | 77 | 20 | 1.4 | 0.1 | 0.6 | 0.9 | | | 1420 | 1350 |
| 6 | 77 | 20 | 0.8 | 0.8 | 0.3 | 1.1 | 0.3 | | 1400 | 1350 |
| 7 | 77 | 20 | 0.8 | 0.8 | 0.3 | 1.1 | | 3 | 1400 | 1350 |
| 8 | 77 | 20 | 0.8 | 0.8 | 0.3 | 1.1 | | | 1550 | 1350 |
| **9 | 79 | 20 | 1 | 0 | 0 | 0 | | | 1550 | 1450 |

| Sample No. | $Al_2O_3$ Average long axis (μm) | $Al_2O_3$ Aspect ratio | $ZrO_2$ Average particle size (μm) | $ZrO_2$ Monoclinic (%) | Solid solution of Sr and Ti in $ZrO_2$ | Flexural strength (MPa) | Breaking toughness (MPa√m) | Hardness (Hv) |
|---|---|---|---|---|---|---|---|---|
| 1 | 1.2 | 2.2 | 0.4 | 25 | solid solution of Sr, Ti | 1452 | 4.5 | 1730 |
| 2 | 1 | 2 | 0.3 | 19 | solid solution of Sr, Ti | 1533 | 5 | 1740 |
| 3 | 1.3 | 2.2 | 0.4 | 31 | solid solution of Sr, Ti | 1452 | 4.6 | 1790 |
| 4 | 0.8 | 1.8 | 0.3 | 16 | solid solution of Ti | 1550 | 5.4 | 1760 |
| 5 | 1.1 | 2 | 0.4 | 22 | solid solution of Sr | 1433 | 4.6 | 1730 |
| 6 | 1 | 2 | 0.3 | 13 | solid solution of Sr, Ti | 1525 | 5.1 | 1750 |
| 7 | 1 | 2 | 0.3 | 14 | solid solution of Sr, Ti | 1473 | 5.1 | 1750 |
| 8 | 1.8 | 2.7 | 0.6 | 42 | solid solution of Sr, Ti | 1268 | 4.2 | 1700 |
| **9 | 2.2 | 2.7 | 0.8 | 67 | smaller than a detectable limit | 1060 | 3.5 | 1610 |

*Ratio to $ZrO_2$
**Outside the scope of the invention.

From Table 4 above, the ceramics (Nos. 1 to 7) having aspect ratios of alumina particles, average long-axis particle sizes and average particle sizes of zirconia that lie within predetermined ranges of the present invention, exhibited strengths of 1425 to 1550 MPa, fracture toughness of 4.5 to 5.4 MPa$\sqrt{m}$, and hardness of 1730 to 1790 Hv. In particular, the material of sample No. 4 that was fired at a low temperature and forming a fine particulate structure exhibited excellent strength, hardness and toughness.

Among the ceramics of the present invention, on the other hand, the ceramics of sample No. 8 having an aspect ratio of alumina particles and an average long-axis particle size lying outside the predetermined ranges, exhibited a high ratio of monoclinic $ZrO_2$, and possessed the strength, hardness and toughness which were smaller than those of the above-mentioned ceramics.

The ceramics (sample No. 9) of Comparative Example containing none of $TiO_2$, MgO and $SiO_2$ exhibited the toughness which was further inferior to that of the ceramics of sample No. 8.

We claim:

1. Alumina/zirconia ceramics containing $Al_2O_3$ in an amount of not less than 65 mass % and $ZrO_2$ in an amount of 4 to 34 mass %, and further containing $TiO_2$, MgO and $SiO_2$ in amounts of not smaller than 0.1 mass %, respectively, the total content of $TiO_2$, MgO and $SiO_2$ being not larger than 4.5 mass %.

2. Alumina/zirconia ceramics according to claim 1, wherein the $ZrO_2$ particles have an average particle size of not larger than 0.5 μm and the $Al_2O_3$ particles have an average long-axis particle size of not larger than 3 μm.

3. Alumina/zirconia ceramics according to claim 1, wherein not less than 20% of $ZrO_2$ are of tetragonal crystals.

4. Alumina/zirconia ceramics according to claim 1, wherein $TiO_2$ and MgO are contained in such amounts that the atomic ratio of Ti/Mg is 0.5 to 1.2.

5. Alumina/zirconia ceramics according to claim 1, wherein $TiO_2$ and MgO are at least partly dissolved as solid solutions in at least part of the crystalline particles of $Al_2O_3$.

6. Alumina/zirconia ceramics according to claim 1, wherein fine particles of a Ti oxide, fine particles of an Mg oxide or fine particles of a composite oxide containing Ti or Mg are precipitated in at least part of crystalline particles of $Al_2O_3$.

7. Alumina/zirconia ceramics according to claim 1, further containing SrO in an amount of 0.1 to 4 mass %, SrO or $TiO_2$ being dissolved as a solid solution in part of the $ZrO_2$ particles.

8. Alumina/zirconia ceramics according to claim 7, wherein the $Al_2O_3$ particles have an average aspect ratio of not larger than 2.5 and an average long-axis particle size of not larger than 1.5 μm, and the average particle size of the $ZrO_2$ particles is not larger than 0.5 μm.

9. Alumina/zirconia ceramics according to claim 8, wherein the content of $TiO_2$, the content of MgO and the content of $SiO_2$ are all not smaller than 0.1 mass %, and the total content of SrO, $TiO_2$, MgO and $SiO_2$ is in a range of 1 to 5 mass %.

10. Alumina/zirconia ceramics according to claim 1, further containing Y in an amount of not larger than 0.4 mol % calculated as an oxide per $ZrO_2$.

11. Alumina/zirconia ceramics according to claim 1, further containing Ce in an amount of not larger than 4 mol % calculated as an oxide per $ZrO_2$.

12. Alumina/zirconia ceramics according to claim 8, having a flexural strength of not smaller than 1200 MPa, a fracture toughness of not smaller than 4.2 MPa·m$^{1/2}$ and a Vickers' hardness of not smaller than 1700.

* * * * *